US008833655B2

(12) United States Patent   (10) Patent No.:   US 8,833,655 B2
McCarty et al.   (45) Date of Patent:   Sep. 16, 2014

(54) MAGNIFICATION COMPENSATING SIGHTING SYSTEMS AND METHODS

(75) Inventors: John McCarty, Greeley, CO (US); Walter D. Stoddard, Loveland, CO (US); Douglas F. Paterson, Windsor, CO (US)

(73) Assignee: Burris Corporation, Greeley, CO (US)

( * ) Notice: Subject to any disclaimer, the term of this patent is extended or adjusted under 35 U.S.C. 154(b) by 0 days.

(21) Appl. No.: 13/481,045

(22) Filed: May 25, 2012

(65) Prior Publication Data

US 2012/0298750 A1   Nov. 29, 2012

Related U.S. Application Data

(60) Provisional application No. 61/490,524, filed on May 26, 2011.

(51) Int. Cl.
  *G06F 19/00* (2011.01)
  *G06G 7/80* (2006.01)
  *F41G 1/38* (2006.01)

(52) U.S. Cl.
  USPC .............. 235/404; 235/400; 42/122; 359/422

(58) Field of Classification Search
  CPC ............... F41G 3/00; F41G 1/00; F41G 3/06; F41G 1/473
  USPC ....................... 235/400–411; 42/122; 359/422
  See application file for complete search history.

(56) References Cited

U.S. PATENT DOCUMENTS

| 722,910 | A | 3/1903 | Saegmuller |
| 2,381,101 | A | 8/1945 | Bausch |
| 3,153,856 | A | 10/1964 | Felix |
| 3,183,594 | A | 5/1965 | Panunzi |
| 3,315,362 | A | 4/1967 | Palmer |
| 3,611,606 | A | 10/1971 | Sefried et al. |
| 3,669,523 | A | 6/1972 | Edwards |
| D234,539 | S | 3/1975 | Marchetti |
| D234,540 | S | 3/1975 | Marchetti |
| 3,877,166 | A | 4/1975 | Ward |
| 3,994,597 | A | 11/1976 | Calder et al. |
| 4,264,123 | A | 4/1981 | Mabie |
| 4,523,818 | A | 6/1985 | Lang et al. |
| 4,531,052 | A | 7/1985 | Moore |
| 4,571,870 | A | 2/1986 | Heideman et al. |
| 4,630,903 | A | 12/1986 | Jones |
| 4,643,542 | A | 2/1987 | Gibson |
| 4,695,161 | A | 9/1987 | Reed |
| 4,777,754 | A | 10/1988 | Reynolds, Jr. |
| 4,845,871 | A | 7/1989 | Swan |

(Continued)

FOREIGN PATENT DOCUMENTS

WO   WO 00/50836   8/2000
WO   WO 03/096216   11/2003

*Primary Examiner* — Michael G Lee
*Assistant Examiner* — Laura Gudorf (57) ABSTRACT

A method is used to determine an aiming point for a sighting system used by a shooter to shoot a target. The method includes receiving a range signal that corresponds to a distance from the shooter to the target. A first position signal is received from a magnification system sensor. A first magnification setting based at least in part on the first position signal is then determined. Thereafter, a first aiming point based at least in part on both of the range signal and the first magnification setting is determined.

14 Claims, 10 Drawing Sheets

(56) References Cited

U.S. PATENT DOCUMENTS

| | | | |
|---|---|---|---|
| 5,343,744 | A | 9/1994 | Ammann |
| 5,400,540 | A | 3/1995 | Solinsky et al. |
| 5,408,359 | A | 4/1995 | Ferrett et al. |
| 5,426,880 | A | 6/1995 | Ruger et al. |
| 5,430,967 | A | 7/1995 | Woodman, III et al. |
| 5,506,727 | A | 4/1996 | Douglas et al. |
| 5,584,137 | A | 12/1996 | Teetzel |
| 5,771,623 | A | 6/1998 | Pernstich et al. |
| 5,783,745 | A | 7/1998 | Bergman |
| 5,784,207 | A | 7/1998 | Satoh |
| 5,920,995 | A | 7/1999 | Sammut |
| 5,941,489 | A | 8/1999 | Fanelli et al. |
| 5,973,315 | A | 10/1999 | Saldana et al. |
| 6,032,374 | A | 3/2000 | Sammut |
| 6,185,854 | B1 | 2/2001 | Solinsky et al. |
| 6,269,581 | B1 | 8/2001 | Groh |
| 6,363,223 | B1 | 3/2002 | Gordon |
| 6,442,883 | B1 | 9/2002 | Waterman et al. |
| 6,453,595 | B1 | 9/2002 | Sammut |
| 6,516,551 | B2 | 2/2003 | Gaber |
| 6,516,699 | B2 | 2/2003 | Sammut et al. |
| 6,574,901 | B1 | 6/2003 | Solinsky et al. |
| 6,580,555 | B2 | 6/2003 | Crista |
| 6,580,876 | B1 | 6/2003 | Gordon |
| 6,606,813 | B1 | 8/2003 | Squire et al. |
| 6,608,298 | B2 | 8/2003 | Gaber |
| 6,615,531 | B1 | 9/2003 | Holmberg |
| 6,681,512 | B2 | 1/2004 | Sammut |
| 6,721,095 | B2 | 4/2004 | Huber |
| 6,729,062 | B2 | 5/2004 | Thomas et al. |
| 6,792,206 | B2 | 9/2004 | Gordon |
| 6,807,742 | B2 | 10/2004 | Schick et al. |
| 6,813,025 | B2 | 11/2004 | Edwards |
| 6,819,495 | B2 | 11/2004 | Shani et al. |
| 6,862,832 | B2 | 3/2005 | Barrett |
| 7,125,126 | B2 | 10/2006 | Yamamoto |
| 7,129,857 | B1 | 10/2006 | Spirkovska |
| 7,292,262 | B2 | 11/2007 | Towery et al. |
| 7,317,520 | B2 | 1/2008 | Wang et al. |
| 7,343,707 | B2 | 3/2008 | Smith, III |
| 7,703,679 | B1 | 4/2010 | Bennetts et al. |
| 8,201,741 | B2 | 6/2012 | Bennetts et al. |
| 8,353,454 | B2 | 1/2013 | Sammut et al. |
| 2002/0089752 | A1 | 7/2002 | Morgan, III |
| 2003/0010190 | A1 | 1/2003 | Sammut et al. |
| 2003/0163278 | A1 | 8/2003 | Clark et al. |
| 2004/0047586 | A1 | 3/2004 | Schick et al. |
| 2004/0068913 | A1 | 4/2004 | Solinsky et al. |
| 2004/0082888 | A1 | 4/2004 | Palazzolo et al. |
| 2004/0088898 | A1 | 5/2004 | Barrett |
| 2004/0144013 | A1 | 7/2004 | Leatherwood |
| 2004/0187374 | A2 | 9/2004 | Solinsky et al. |
| 2004/0231220 | A1 | 11/2004 | McCormick |
| 2004/0234812 | A1 | 11/2004 | Naito et al. |
| 2005/0002668 | A1 | 1/2005 | Gordon |
| 2005/0021282 | A1 | 1/2005 | Sammut et al. |
| 2005/0036109 | A1 | 2/2005 | Blum et al. |
| 2005/0200959 | A1 | 9/2005 | Yamamoto |
| 2005/0252062 | A1 | 11/2005 | Scrogin et al. |
| 2006/0010760 | A1 | 1/2006 | Perkins et al. |
| 2006/0162226 | A1 | 7/2006 | Tai |
| 2006/0164704 | A1 | 7/2006 | Sieczka et al. |
| 2007/0086893 | A1 | 4/2007 | Pedersen |
| 2007/0097351 | A1 | 5/2007 | York et al. |
| 2007/0234626 | A1 | 10/2007 | Murdock et al. |
| 2007/0277421 | A1* | 12/2007 | Perkins et al. .................. 42/122 |
| 2009/0266892 | A1* | 10/2009 | Windauer et al. ............. 235/404 |
| 2011/0075125 | A1* | 3/2011 | Kanayama .................... 356/4.06 |
| 2012/0048931 | A1* | 3/2012 | Arbouw ........................ 235/404 |
| 2012/0097741 | A1 | 4/2012 | Karcher |
| 2012/0186130 | A1 | 7/2012 | Tubb |
| 2012/0298750 | A1 | 11/2012 | McCarty et al. |
| 2013/0033746 | A1 | 2/2013 | Brumfield |
| 2013/0047485 | A1 | 2/2013 | Tubb |
| 2013/0199074 | A1 | 8/2013 | Paterson et al. |
| 2013/0206836 | A1 | 8/2013 | Paterson et al. |

* cited by examiner

FIG.7

MAGNIFICATION COMPENSATING SIGHTING SYSTEMS AND METHODS

CROSS-REFERENCE TO RELATED APPLICATION

The present application claims priority to and the benefit of U.S. Provisional Application Ser. No. 61/490,524, filed May 26, 2011, entitled "Magnification Compensating Sighting Device and Methods," the disclosure of which is hereby incorporated by reference herein in its entirety.

INTRODUCTION

Figure 1A:
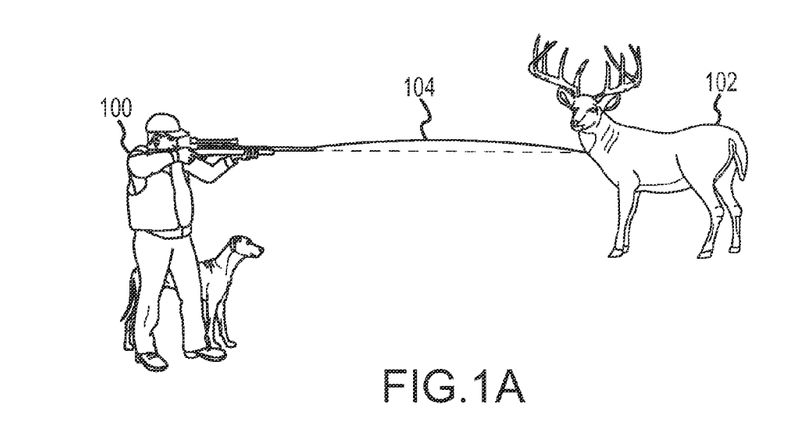
FIGS. 1A and 1B are simplified representations of the effect of gravity on the flight of a bullet.
Figure 1B:
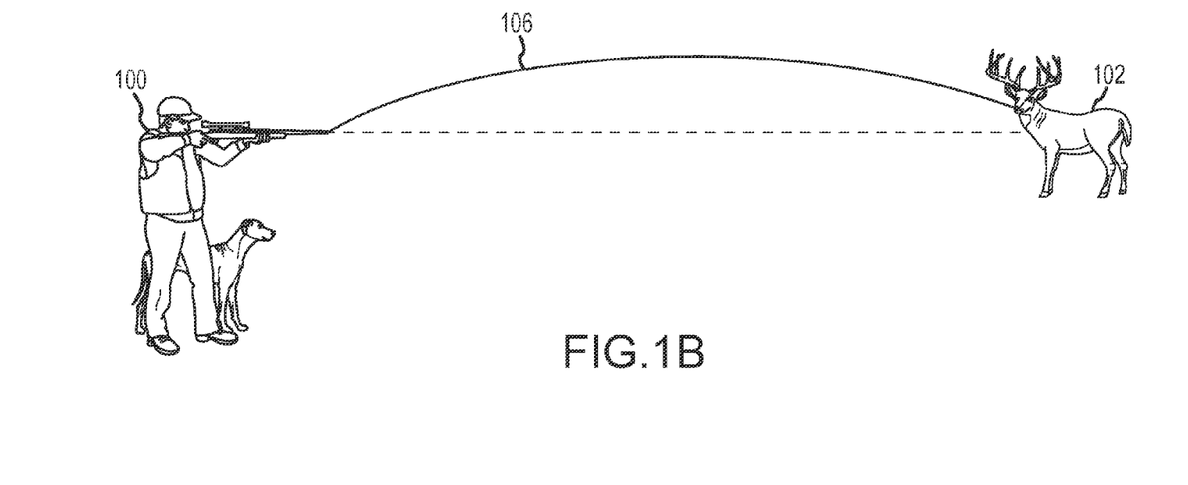

Aiming a rifle or gun requires the consideration of several environmental and other types of factors. When a bullet travels from a rifle to an intended target, several forces affect the flight of the bullet. Gravity causes the bullet to drop in elevation as the bullet travels from the firearm to the target. If a hunter 100 is close to his/her target 102, as shown in FIG. 1A, the bullet drops very little, represented by the adjusted trajectory 104. However, improvements in firearms and ammunition have allowed hunters to target game from long distances. At these greater distances, gravity causes a bullet to drop in elevation more significantly, as represented by the adjusted trajectory 106 in FIG. 1B. Other factors also affect the flight of the bullet. For instance, wind causes the bullet to move horizontally along the bullet's path of flight. The compensation in an optical device for the effect wind has on a bullet's flight is often referred to as windage. Humidity, elevation, temperature, and other environmental factors may also affect the flight of the bullet.

Different bullets fired from a gun are affected to a greater or lesser degree by environmental factors. More massive bullets are affected less by wind and some other environmental forces. In addition, some bullets travel at higher initial speeds than other bullets, and shape affects the rate at which bullets slow down, both of which affect the flight of the bullet. All of these factors create a unique bullet trajectory for every shot taken from a rifle.

Sighting a target requires a number of manual steps by a rifleman. Some of those steps may be forgotten by an inexperienced or rushed rifleman, leading to inaccurate shots. For example, a typical targeting scenario utilizing an optical sight may require first scanning a field of view at a low magnification setting in order to identify a potential target. Once a potential target is identified, the rifleman must determine the range to the target. Certain optical devices allow this distance to be calculated with the press of a button on the optical device. Once the range is determined, the optical device illuminates or otherwise displays an aiming element located on an aiming component (e.g., a reticle), based on the distance to target and ballistic information programmed into the optical device. In other optical devices that do not include illuminated aiming points, the rifleman must adjust the aiming points manually. Thereafter, many riflemen often adjust the magnification setting up or to a maximum setting allowed on the optical device. Sometimes, however, rushed or novice riflemen forget to adjust the sight to maximum magnification. Since the optical device displays or identifies the ideal aiming point based on a specific (usually a maximum) magnification set point, an inaccurate shot may be taken if the rifleman fails to set the magnification to the correct setting.

SUMMARY

In one aspect, the technology relates to a method of determining an aiming point for a sighting system used by a shooter to shoot a target, the method including: receiving a range signal, wherein the range signal corresponds to a distance from the shooter to the target; receiving a first position signal from a magnification system sensor; determining a first magnification setting based at least in part on the first position signal; and determining a first aiming point based at least in part on both of the range signal and the first magnification setting.

In another aspect, the technology relates to a sighting system for visually acquiring a target, the sighting system including: an optic device having a fixed lens and a moveable lens, wherein the fixed lens and the movable lens define an optical path, and wherein the movable lens is movable along the optical path; an actuator for moving the movable lens; a sensor for determining at least one of a position of the movable lens and a position of the actuator; and a processor for receiving a sensor signal sent from the sensor.

In another aspect, the technology relates to a method of calibrating an optical device having a sensor, wherein the sensor detects a position of a magnification system element, the method including: receiving a first signal from the sensor, wherein the first signal corresponds to the magnification system element first position; receiving a second signal from the sensor, wherein the second signal corresponds to the magnification system element second position; mapping a first point on a predefined magnification curve to the first signal; and scaling the predefined magnification curve such that a second point on the scaled predefined magnification curve is mapped to the second signal.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

The present technology relates to new and improved embodiments of known sighting systems and methods (such as those described in U.S. Pat. No. 7,703,679, the disclosure of which is hereby incorporated by reference herein in its entirety), for correctly aiming a firearm or other implement. As used herein, a "sighting system" shall be construed broadly and is defined as one or more optical devices and processing systems that assist a person in aiming a projectile launch system, such as a firearm, a rifle, or other implement. The disclosed technology has application in any type of sighting system or optical device, including those with addressable aiming elements and those without. In this application, a riflescope will be described as an exemplary embodiment.

Figure 2A:
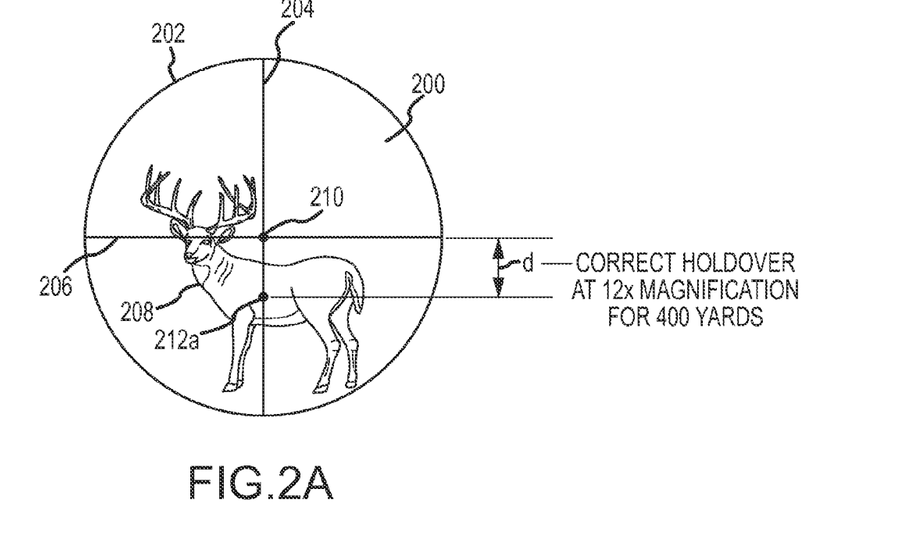
FIGS. 2A-2C depict the field of view from an optical device at different magnification settings.

A hunter, sniper, or other person using a rifle or other firearm, commonly referred to as a shooter, uses optical sighting systems, such as riflescopes, to visually acquire a target and improve aiming accuracy. Generally, riflescopes provide a magnified field of view 200 defined by a field stop 202 around an intended target 208, as shown in FIG. 2A. By placing the target 208 within the field of view 200 and aiming the rifle with crosshairs 204 and 206, the riflescope improves the aiming accuracy for a rifleman for shots taken over long distances. Many riflescopes provide a reticle, which is an aiming device superimposed on the field of view 200, and consists of a vertical crosshair 204 and a horizontal crosshair 206 or other pattern. A hunter can use an intersection 210 of the vertical 204 and horizontal 206 crosshairs to aim the rifle. At significant distances, however, aiming points are used to compensate for factors such as those described above, especially the effects of gravity. In these cases, an optical device displays or illuminates an aiming point 212a, which the hunter then aligns with the target 208. It should be noted that aiming points to the sides of the vertical crosshair 204 may also be energized, as required to compensate for windage. For simplicity in this application, however, energizing of aiming points only on the vertical crosshair 204 will be discussed. Typically, in known riflescopes, the aiming point is selected and energized based on the assumption that the riflescope has been set to a predefined magnification. In many riflescopes, the predefined magnification setting is the maximum magnification setting. Accordingly, it is critical that the rifleman set the riflescope to the appropriate magnification before taking the shot.

FIG. 2A depicts the target 208 at such a maximum magnification, in this case, 12× magnification at a target distance of 400 yards. The aiming or holdover point 212a is aligned with the target 208, which causes the rifle to fire higher, so as to compensate for the factors described. As depicted, the aiming point 212a is an angle distance d below the intersection 210 of the crosshairs 204 and 206. Thus, the holdover point 212a is aligned on the target 208 at maximum magnification, and the holdover point 212a is appropriate for the depicted maximum magnification. In the depicted embodiment, the holdover point 212a is an addressable, energizable element that is illuminated or energized by a central processing unit (CPU) associated with the sighting system. The CPU is programmed to energize the holdover point 212a based on a predetermined magnification, in this case, a maximum magnification.

Figure 2B:
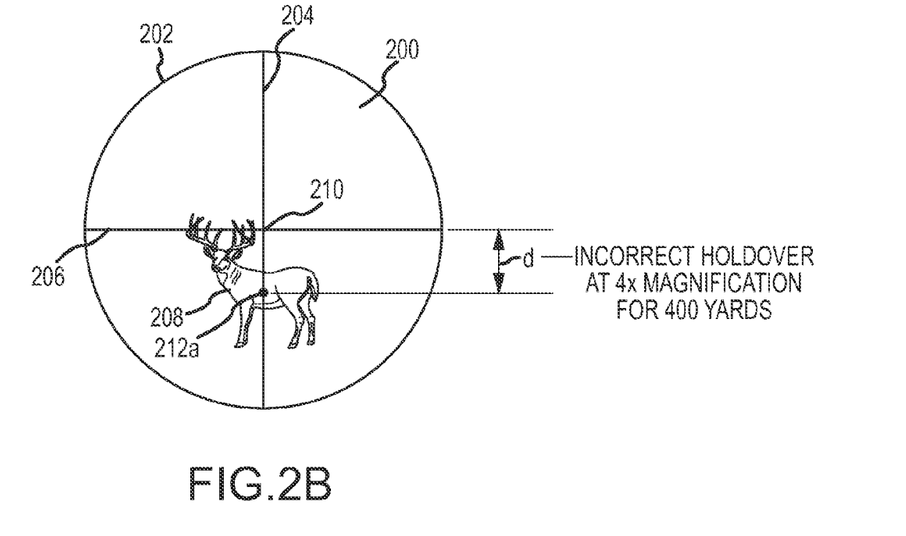

FIG. 2B illustrates a typical problem encountered by inexperienced, rushed, or forgetful shooters. As with the example in FIG. 2A, the holdover point 212a is energized based on a maximum magnification. However, in this figure, the shooter has not set the sighting system to maximum magnification, but has instead set the optical device to 4× magnification at 400 yards, which is typical for sweeping an area in an effort to identify a target. Accordingly, the holdover point 212a is not correct for the set magnification. Thus, when the holdover point 212a is aligned with the target 208, the shot will not be accurate.

Figure 2C:
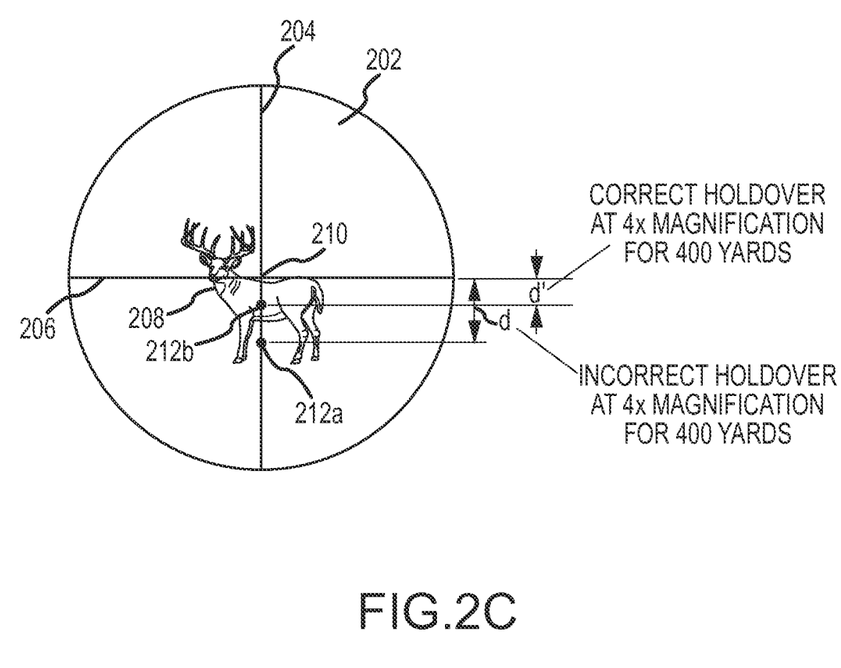

FIG. 2C depicts the target 208 at a magnification less than the maximum, in this case, 4× magnification at a target distance of 400 yards. The present technology energizes a different aiming point 212b based on this known magnification. The aiming point 212b is located at an angle distance d' below the intersection 210, which is the correct holdover at 4× magnification. This holdover point 212b may then be aligned with the target 208 and an accurate shot taken. FIG. 2C also depicts holdover point 212a, which is the incorrect aiming point at 4× magnification. Of course, holdover point 212a would not be energized while the correct holdover point 212b is energized. Should the magnification setting be changed to 12× magnification, however, the holdover point 212b will be de-energized and the holdover point 212a energized. Utilizing the technology described herein, different holdover points between a maximum and a minimum magnification for a particular optical device may be energized individually based on the magnification settings. The technology enabling this functionality is described below.

Figure 3:
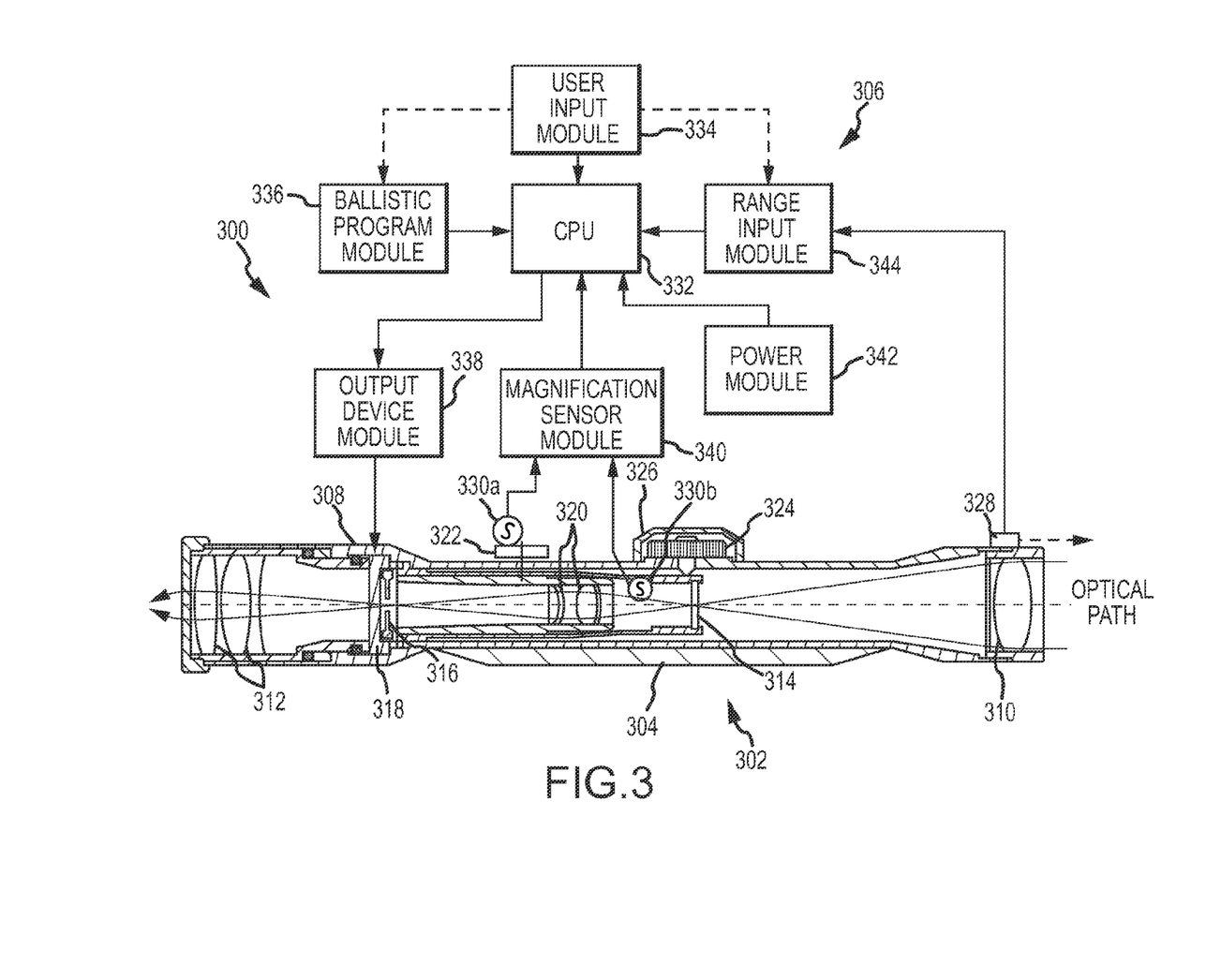
FIG. 3 is a diagram of a sighting system.

An exemplary sighting system 300 for visually acquiring a target and providing an aiming point in accordance with the present technology is depicted in FIG. 3. The sighting system 300 includes an optic device 302, in this case, a riflescope attached to a firearm or other implement with a mounting rail 304. The sighting system 300 also includes a control system 306 that includes a number of components to improve accuracy during use of the optical device 302.

Referring first to the optical device 302, the device 302 includes a housing 308 that contains not only the elements of the optical device 302, but also the various components of the control system 306. In this embodiment, the control system 306 is depicted schematically outside of the housing 308 for clarity. The optical device includes an objective lens assembly 310 and an ocular lens assembly 312. A first focal plane lens 314 and a second focal plane lens 316 are located between the objective 310 and ocular 312 lens assemblies. These focal plane lenses 314, 316 define an optical path through which a target may be acquired. Located proximate the second focal plane 316 is a plano lens 318 that may include crosshairs and addressable aiming elements as described herein. A moveable lens assembly 320 is located along the optical path and may be moved towards and away from the first focal plane lens 314 by a magnification adjuster 322. Movement of this lens assembly 320 by the magnification adjuster 322 allows for adjustment of magnification. Certain scopes that do not include addressable elements on the plano lens 318 may include an elevation adjustment actuator 324 that is protected by a cap 326. However, the embodiments depicted herein include such addressable elements. The optical device 302 also includes an integrated laser range finder 328, although the sighting systems described herein may be used in conjunction with remote range finders or no range finder at all.

The optical device 302 includes one or more magnification sensors 330a, 330b. The magnification sensors 330a, 330b provide signals that may be used to calculate, estimate, or otherwise determine a magnification setting of the optical device 302. For example, the sensor 330a may be a rotary motion, or a rotary or linear sensor for detecting a position of the magnification adjuster 322. The signal sent from the sensor 330a, then, may then be used to determine the magnification setting. Other potential sensors 330a include a power ring angular position sensor that detects the position of a power ring that may be adjusted to control magnification.

Additionally or alternatively, a sensor 330b such as a linear motion sensor or a position sensor that detects the position of the movable lens assembly 320 relative to a datum within the optical device 302 may be used. This sensor 330b may detect the distance between one of the lenses of the moveable lens assembly 320 and one of the focal plane lenses 314, 316. For sensors that provide position output, the output may be used to determine a change in lens position relative to one another. In certain embodiments, this can be performed mechanically or electrically via a CPU 332. The relative position or location of other scope components is also contemplated to determine the magnification setting. For optical devices utilizing cameras, the controls used to increase magnification may send a signal to the CPU 332 to indicate the magnification setting. More than one sensor may be used to ensure accuracy or to provide redundancy for a given optical device 302. The types of sensors utilized in the present technology may be encoders, such as laser encoders, proximity sensors, proximity switches, photoelectric sensors, photo eyes, fiber optic sensors, ultrasonic sensors, and potentiometers.

Turning now to the control system 306, components thereof include the CPU 332, a user input module 334, a ballistics program module 336, an output device module 338, a magnification sensor module 340, a power module 342 such as a battery, and a range input module 344. The CPU 332 receives inputs or data from the user input module 334, the range input module 344, and the magnification sensors 330a, 330b via the magnification sensor module 340. The CPU 332 may execute a ballistics program from the ballistics program module 336, which may be a look-up table. Alternatively, the CPU 332 may receive ballistics information from the user input module 334. The CPU 332 uses the received information to determine a correct aiming point for the optical device 302, which is displayed via the output device module 338.

The CPU 332 is a hardware or combination hardware/software device for processing the input information and for determining a correct aiming element to address or display on the plano lens 318. In exemplary embodiments, the CPU 332 is a microcontroller or microprocessor, for example the 8-bit MCS 251 CHMOS microcontroller available from Intel® Corporation. In other embodiments, the CPU 332 is a custom-made, application specific integrated circuit or field programmable gate array that is operable to perform the functions described herein. An exemplary microcontroller may be implemented in a ball grid array, pin grid array, or as chip-on-glass to allow the microcontroller to be mounted to the plano lens 318 and control the aiming element array without requiring signal transmission over a wire or other connection from a separate or removed location to the plano lens 318. In other embodiments, the controller is a separate component that is communicatively coupled to an addressing chip that is mounted to and energizes the addressable aiming elements on the plano lens 318.

The user input module 334 may include any device or system for inputting information into the CPU 332. The user input module 334 interfaces with any input device(s), such as a keyboard, a mouse, a pen, a voice input device, a touch input device, etc. In exemplary embodiments, the user input module 334 interfaces with or is a personal digital assistant, cell phone, or other handheld device that can be communicatively coupled to the CPU 332. The handheld device can provide information to the CPU 332, such as bullet characteristics (e.g., bullet mass, bullet type, muzzle velocity, etc.), environmental conditions (e.g., elevation, wind, temperature, humidity, etc.), rifle characteristics, range, or other information. In embodiments, the handheld device may transmit the information from a distance.

The ballistic program module 336 includes a ballistics program that is any data and/or executable software instructions that provide ballistics information. For example, the ballistics program may be the Infinity Suite of exterior ballistics software offered by Sierra Bullets of Sedalia, Mo. Ballistics information is generally defined as any data or information that describes the flight of a projectile, such as a bullet under the influence of environmental, gravitational, or other effects. The ballistics information may be based on information received about the mass of the bullet, the bullet's coefficient of drag or other ballistic coefficients, the muzzle velocity, humidity, barometric pressure, wind velocity, wind direction, altitude, angle of the shot, range, diameter of the bullet, and other considerations. As one skilled in the art will recognize, some or all of this input information can be used to determine characteristics of a bullet's flight. In other embodiments, a ballistics program calculates ballistics information, which is provided in a number of look-up tables. Thus, rather than calculate the ballistics information, a set of ballistic information is pre-calculated and used by the CPU 332. Examples of look-up tables, as well as methods of providing an aiming point on a target, are described generally in U.S. Pat. No. 7,703,679, the disclosure of which is hereby incorporated by reference herein in its entirety. These methods may be further supplemented to compensate for a magnification setting of an optical device, as described herein.

The output device module 338 communicates with one or more elements in the optical device 302 to convey data or information to a rifleman. These elements may include a display, speakers, etc. In the depicted embodiment, the output device is located on the plano lens 318 and forms the user interface used to display information for determining the aiming point and/or displaying the aiming point. In an exemplary embodiment, the reticle 318 may include a transmissive OLED or an LCD/LED display, to provide the information to the shooter. Transmissive OLED arrays, as well as methods for automatically displaying an aiming point thereon, are described in U.S. Pat. No. 7,703,679, the disclosure of which is hereby incorporated by reference herein in its entirety. The CPU 332 calculates which addressable aiming point on the plano lens 318 needs to be energized, based on the actual magnification setting. In the embodiments described herein, the aiming point is located on the vertical crosshair 204 (FIGS. 2A-2C). A dot, a circle, a donut, a box, a triangle, or other shape may define the aiming point. In embodiments, the CPU 332 addresses or controls an aiming component, for example, a transmissive OLED array, in the riflescope 302. The aiming component may include a transmissive OLED array integral with the plano lens 318 or, simply, a plano, which is defined as a piece of transparent material that has no refractive power. The aiming component may also, in some embodiments, include an organic LED or other LED that superimposes an image of the reticle and/or an aiming element onto the plano lens 318.

The magnification sensor module 340 interfaces with the magnification sensors 330a, 330b and may process the signals sent therefrom or send the signals directly to the CPU 332. The power module 342 provides power to the CPU 332, which may power the other components directly. In alternative embodiments, the power module 342 may be connected to and power certain components directly, but not via the CPU 332.

The range input module 344 receives a range input the range finder 328. In this case, the range finder 328 is integrated with the optical device 302. Exemplary integrated optical devices and laser range finders include the 4×-12×-42 mm, LaserScope riflescope, as well as the Eliminator® riflescope, both available from Burris Corporation of Greeley, Colo. Alternative embodiments of range finders include any device that can determine the distance between the shooter and an intended target, such as a hand-held laser range finder or GPS system. In such embodiments, the user may enter the range through the user input module 334. It should be noted that the present technology may be utilized in optical devices or scopes that do not have range finding functionality and that include some means or structure to manipulate the aiming point on the reticle. In certain embodiments, the manipulation structure may include a moveable wire having a plurality of aiming points mounted thereon.

Figure 4A:
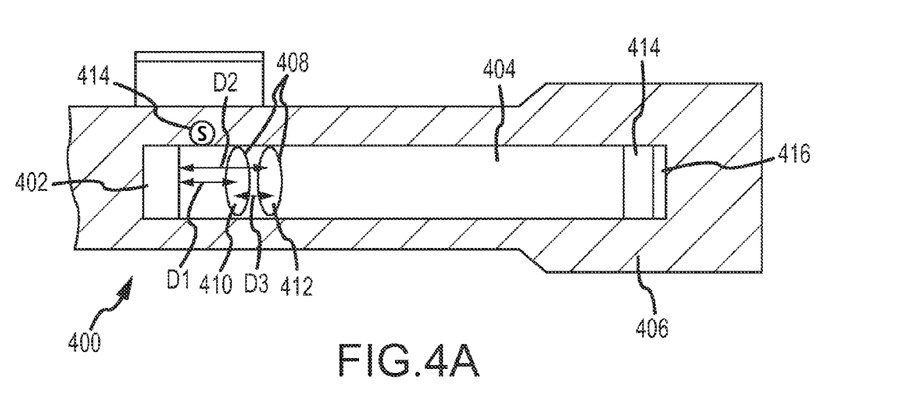
FIGS. 4A and 4B depict partial side sectional views of an optical device.
Figure 4B:
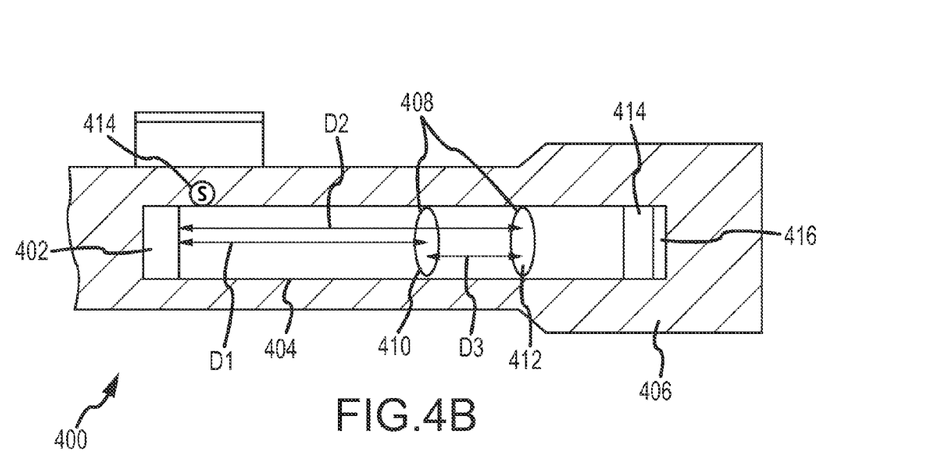

FIGS. 4A and 4B are partial side sectional views of an optical device 400 at different magnification settings. FIG. 4A depicts the optical device 400 at a higher magnification power, while FIG. 4B depicts the optical device 400 at a lower magnification power. In these figures, the first focal plane lens 402 is located at a forward end of a tube 404 located within the optical device housing 406. The tube 406 supports a movable lens assembly 408 that includes two lenses, a forward lens 410 and a rearward lens 412. Rotation of an actuator or magnification power ring (not shown) moves the lenses 410, 412, as known in the art. A position sensor 414 may be used to detect the position of either or both of the lenses 410, 412, relative to a fixed location (e.g., the front focal plane lens 402) or each other. For example, the sensor 414 may detect a distance D1 from the front focal plane lens 402 to the forward lens 410; a distance D2 from the front focal plane lens 402 to the rearward lens 412; or a distance D3 from the forward lens 410 to the rearward lens 412. In other embodiments, distances to a rear focal plane lens 414, plano lens 416, or other fixed point or element may be measured.

Exact magnification and determination of accurate magnification values in an optical device is difficult for a number of reasons. For example, changes in magnification in optical devices are accomplished by moving one or more optical elements along an optical path relative to other elements and each other. This relationship is depicted herein FIGS. 4A and 4B, where the forward and rearward lenses 410, 412 move relative to both other fixed lenses and to each other. The actuator system used to move these elements must be precise, particularly when more than one element needs to move independently. Additionally, space within the optical device housing is limited, reducing the space available for the sensors required for the system to function. Manufacturing tolerances of the various components are such that minor variations in tolerance can have a significant effect on the calculations required to detect the positions of the various elements. For example, rotary actuators are typically used to adjust magnification and therefore, lens position. These systems have a significant number of parts, each with its own required manufacturing tolerance. Similarly, the glass elements of the entire optical device have their own manufacturing tolerances, each of which affect overall magnification. As a result, there is variation of actual magnification power from scope to scope. The variations include variations of maximum power, minimum power, and extent of magnification change.

Complexity also is increased because magnification change is not linear. That is, moving the movable lens assembly 408 one half of the remaining distance toward the front focal plane lens (in the examples of FIGS. 4A and 4B), does not necessarily double the magnification power. Efforts to make adjustment force light and uniform further complicate the relation of actuator rotation to magnification. Moreover, magnification measurement itself has limitations that present challenges to determining actual magnification values and actual position in the adjustment range accurately enough to allow accurate magnification compensation.

Sensors 414 used in the disclosed technology may measure relative motion or position. The motion or position may be of the moveable lenses 410, 412 or of the actuator that moves them. The sensor 414 output must be translated by the CPU to compensate for changes in magnification. Overcoming the above-identified difficulties is possible, in one embodiment, by considering relative magnification rather than absolute magnification. The CPU is programmed to allow calibration of the sensor for individual assembly variations. For a particular model of an optical device, the sensor output (and therefore the position of the element being sensed) is mapped relative to the magnification setting. In certain embodiments, the magnification settings include the maximum and minimum magnifications, as well as any magnification settings therebetween.

Figure 5A:
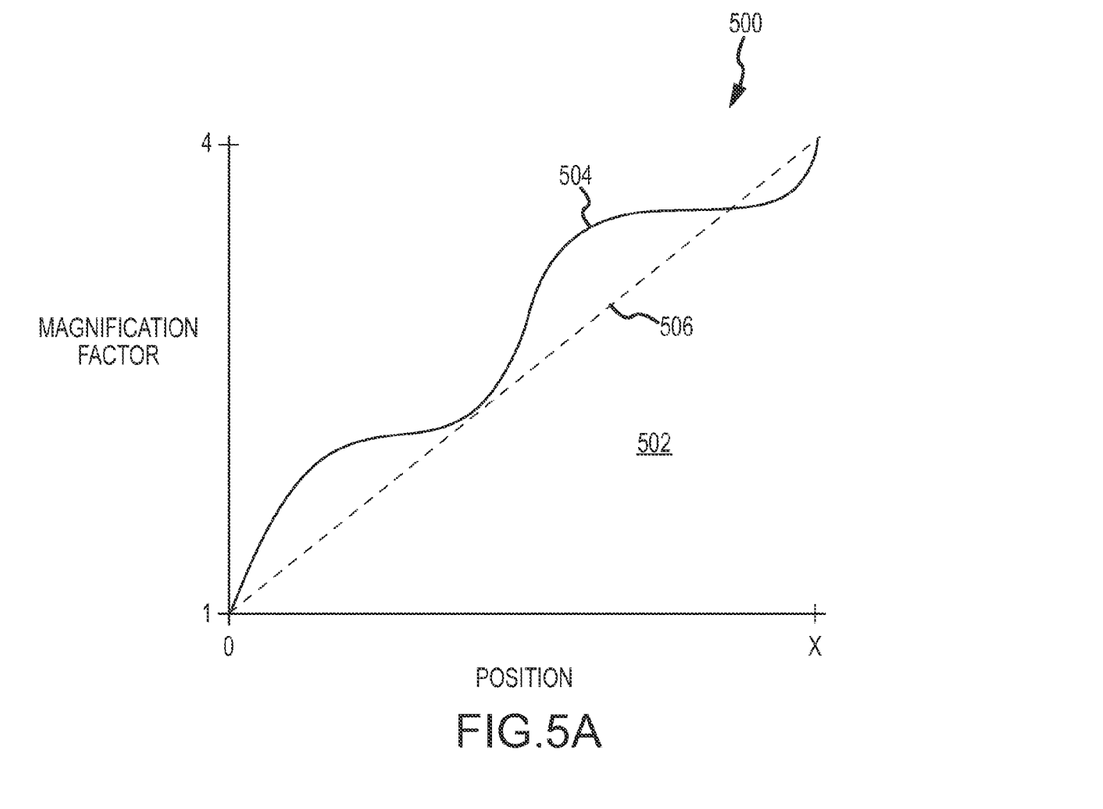
FIG. 5A depicts a model magnification curve for a particular model of an optical device.

FIG. 5A depicts a model 500 magnification curve for a particular model of an optical device. In this figure, the vertical axis of a field 502 depicts the magnification factor or setting on a scale from 1 to 4, which is common in many commercial riflescopes. The horizontal axis depicts the position of an adjustable element of a magnification system. As the position of the adjustable element is determined by a signal output from a position sensor, the vertical axis also corresponds to the signals output by the position sensor. As described above, the adjustable element may be an actuator for a set of moveable lenses, one or more moveable lenses, a movable lens relative to another moveable lens, etc. For this example, the position of a magnification adjustment dial is described. As the adjustment dial is rotated from a low magnification setting to a higher magnification setting, the position sensor signal changes. In the figure, the initial position/initial signal (which in this case, corresponds to a minimum magnification) is at point O. As the dial is rotated, magnification increases until the sensor is in its maximum position, indicated by point X. This position/signal corresponds to a maximum magnification. As can be seen, the magnification setting along the curve 504 is not linear, as compared to line 506. The curve 504 is determined for a particular model of an optical device by adjusting the position of the sensor and determining a magnification setting at each position (as identified by a signal output from the sensor) of the actuator. Of course, mapping a greater number of positions/signal outputs increases the accuracy of the curve and therefore, the optical device. In certain embodiments, the magnification settings of up to 10, 25, 50, 75 or more positions or signal outputs may be determined. This curve 504 then serves as the general map for that particular model of scope and correlates a sensor change or position with a corresponding magnification setting.

Figure 5B:
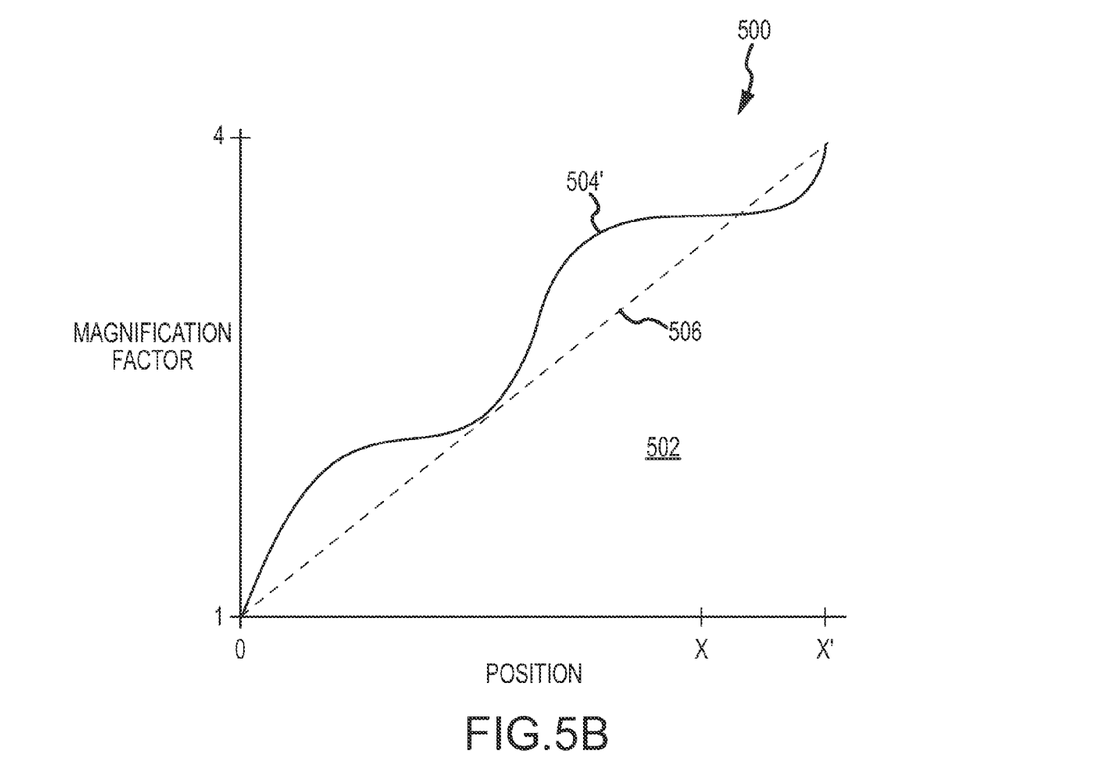
FIG. 5B depicts the magnification curve of FIG. 5, mapped to a specific optical device.

This curve 504 is then programmed into the CPU of every individual riflescope in that model series. FIG. 5B depicts the model 500 magnification curve of FIG. 5A, but applied to a particular scope within the model series. Here, the sensor has an initial, minimum position or signal, depicted by point O, that is the same as the model scope of FIG. 5A. The maximum position or signal, however, is indicated by point X' (the maximum position of the scope of FIG. 5A is depicted hereon for reference by point X). As described above, this difference in maximum positions or signal, as indicated by points X and X' may be the result of manufacturing tolerances or other variances between two particular scopes. Regardless, the curve 504 is applied to the particular scope to produce a scaled curve 504' between the points O and X that define the minimum and maximum positions or signals. The model curve 504 may be applied to any number of different scopes within a model series to provide an acceptable magnification curve for an individual scope. For each individual scope, then, the maximum and minimum magnification may be calibrated in and the curve applied to that calibration. As the maximum and minimum magnification settings constitute the end points of the calibration curve, the curve 504 may be scaled as required to fit these maximum and minimum end points. This is advantageous to the time- and labor-intensive process that would be required to map the curve for each individual scope during the manufacturing or calibration process. Absolute magnification is then accommodated by standard sight-in and ballistic calibration processes, which are needed even in the absence of the magnification compensation technology described herein.

Figure 5C:
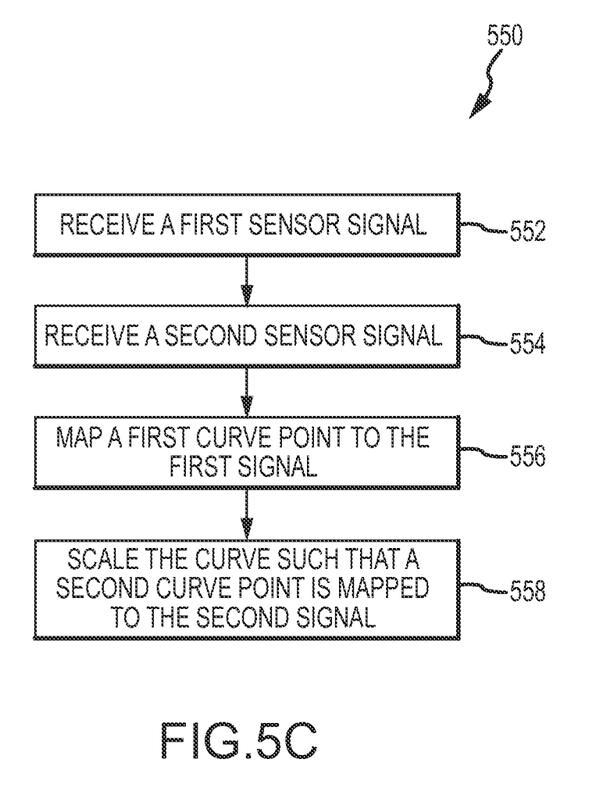
FIG. 5C depicts a method of calibrating an optical device.

FIG. 5C depicts a method of performing a calibration 550 for an optical device. The CPU of a sighting system first receives a first signal from a position sensor of an magnification system element, such as an actuator (Step 552). Thereafter, an operator or an automated process may adjust the actuator and a second signal is received by the CPU (Step 554). A first point of the predetermined magnification curve (determined from a model optical device) is then mapped to the first signal received (Step 554). In certain embodiments, the two signals may be indicative of sensor positions at the maximum and minimum positions in a range of motion, although other positions may also be used. One advantage of using the maximum and minimum positions, however, is that it is easier to map the extreme positions of a range to the extreme positions of the predetermined curve. One way that the first signal may be mapped to a first point on the curve is by plotting the first point in a field, as depicted in FIGS. 5A and 5B. In another embodiment, the first signal may be mapped to the curve as that curve is presented in a look-up table. Thereafter, the curve is scaled such that a second point on the curve is mapped to the second signal received by the CPU (Step 558). Thereafter, this scaled curve may be stored for application by the sighting system during use of the optical device. The magnification setting that corresponds to the first and second signals need not be determined or confirmed, but may be if desired. Once calibrated, the program may determine the magnification based on the sensor signal, but need not independently confirm the magnification setting for that particular scope.

Figure 6:
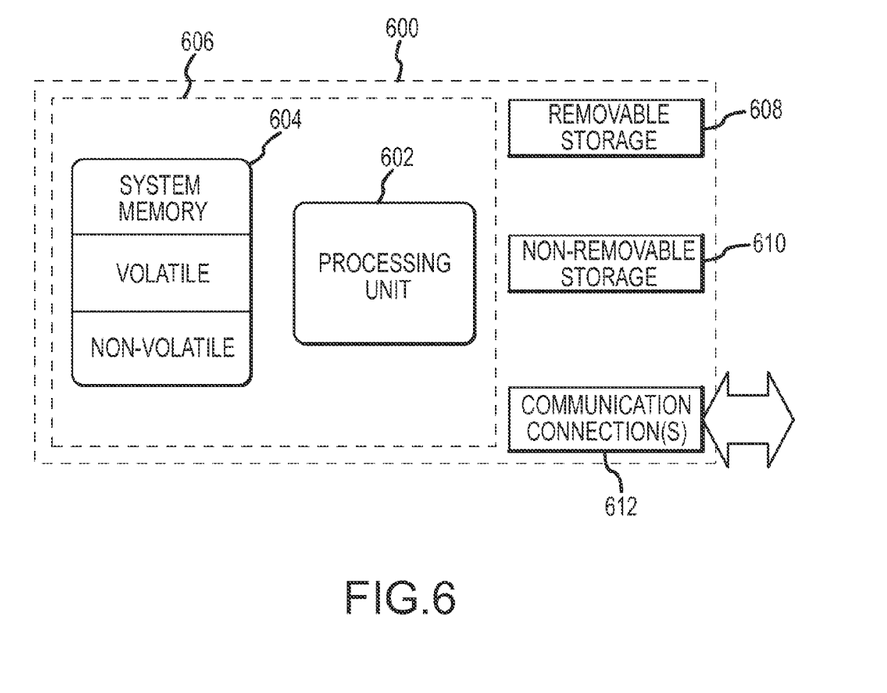
FIG. 6 is block diagram representing an exemplary embodiment of a sighting system controller.

In embodiments, the CPU 332 (FIG. 3) includes any electronics or electrical devices required to perform the functions described herein. For example, an embodiment of a suitable operating environment in which the present technology may be implemented is shown in FIG. 6. The operating environment is only one example of a suitable operating environment and is not intended to suggest any limitation as to the scope of use or functionality of the technology. Other well known controller/processor systems, environments, and/or configurations that may be suitable for use with the technology include, but are not limited to, hand-held devices, multiprocessor systems, microprocessor-based systems, programmable consumer electronics, or other computing environments that include any of the above systems or devices, and the like.

With reference to FIG. 6, an exemplary computing environment for implementing the embodiments of the CPU 332 (FIG. 3) includes a computing device, such as computing device 600. In its most basic configuration, computing device 600 typically includes at least one processing unit 602 and memory 604. Depending on the exact configuration and type of computing device 600, memory 604 may be volatile (such as RAM), non-volatile (such as ROM, flash memory, etc.), or some combination of the two. The most basic configuration of the controller/processor is illustrated in FIG. 6 by dashed line 606.

Additionally, device 600 may also have additional features and functionality. For example, device 600 may also include additional storage. Such additional storage is illustrated in FIG. 6 by removable storage 608 and non-removable storage 610. Such computer storage media includes volatile and non-volatile, removable and non-removable media implemented in any method or technology for storage of information such as computer readable instructions, data structures, program modules, or other data. Memory 604, removable storage 608, and non-removable storage 610 are all examples of computer storage media. Computer storage media includes, but is not limited to, RAM, ROM, EEPROM, flash memory, or other memory technology. Any such computer storage media may be part of device 600.

Device 600 may also contain communications connection(s) 612 that allow the device to communicate with other devices. Communications connection(s) 612 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Computing device 600 typically includes at least some form of computer readable media, which can be some form of computer program product. Computer readable media can be any available media that can be accessed by processing unit 602. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of any of the above should also be included within the scope of computer readable media.

To use the sighting system 300, in general, the CPU 332 accepts information from the various modules, for example, information regarding the bullet and/or cartridge characteristics, rifle characteristics, any environmental considerations, etc. After receiving these inputs, the CPU 332 requires the range to determine the correct holdover adjustment. The range input module 344 provides the range to the target before the rifle is fired. Additionally, the CPU 332 determines a present magnification setting of the optical device 302. The CPU 332 determines the holdover adjustment and other corrections and automatically addresses or energizes a particular aiming element, to provide an accurate aiming point on the plano lens 318. The aiming point is the displayed aiming element that represents the point in the field of view of the optical device 302 that should be positioned on the visually acquired target to correctly aim the rifle for the intended shot (that is, the expected point of impact). By aiming the rifle with the aiming point, the rifleman can correctly aim the rifle for the target range, magnification setting, environmental conditions, cartridge characteristics, or other considerations, without needing to manually calculate corrections using graduated markings on the reticle crosshairs or making manual adjustments.

Figure 7:
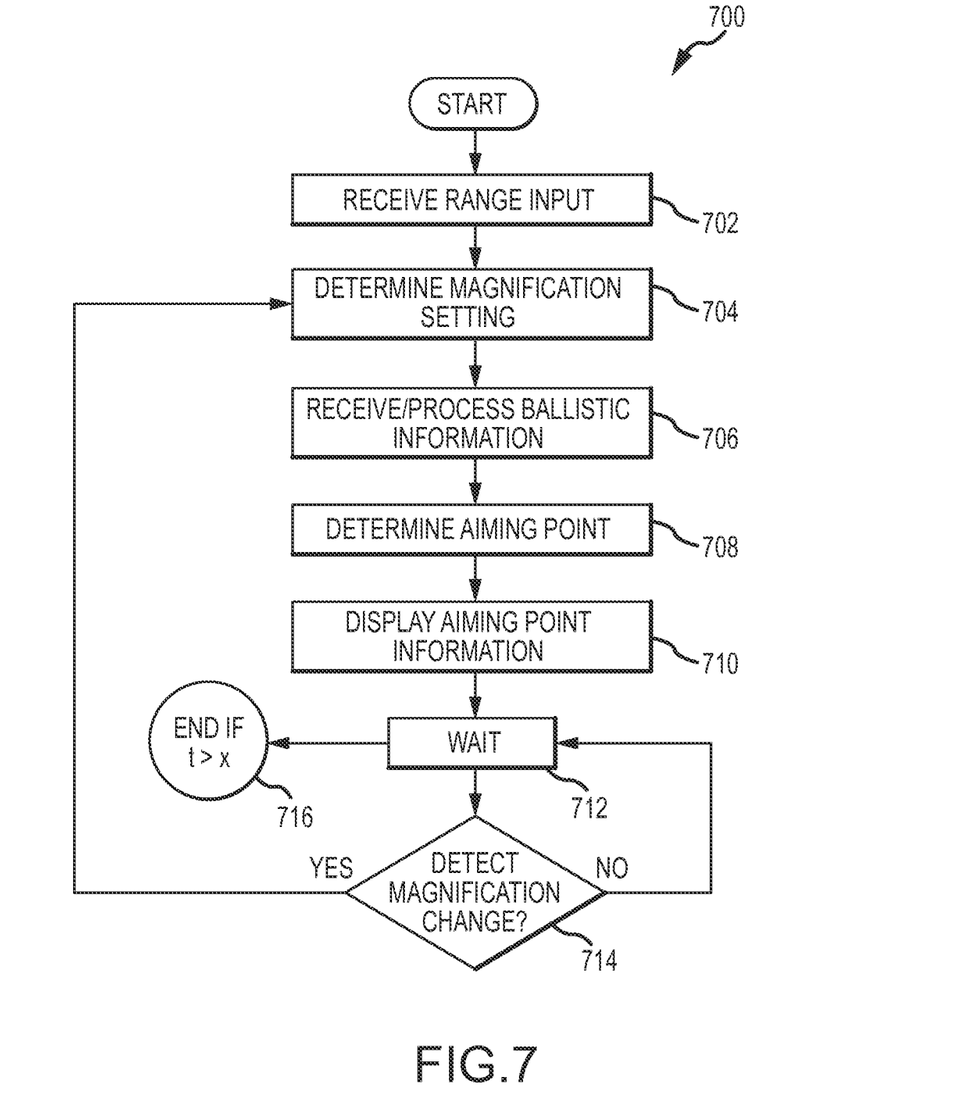
FIG. 7 depicts a method of automatically providing an aiming point for a sighting system.

A more specific embodiment of a method of providing an aiming point 700 is depicted in FIG. 7. Once a potential target is identified, a rifleman must first determine or estimate a range to the target. This may be done by simply pressing a button on a surface of the optical device, by using a remote range finder, or by estimating the range based on known conditions or personal experience. Regardless, this information may then be input via the user input module or sent directly to the CPU, where it is received (Step 702). The magnification setting of the optical device (Step 704) may then be determined (by processing signals sent from one or more of the sensors described above). Once the magnification setting has been determined, the processor within the optical device (if present) accesses a lookup table of ballistics information and identifies the appropriate information for the ammunition being used (Step 706). Typically, this information would be programmed into the processor of the optical device in advance by the rifleman. Steps 702, 704, and 706 may be performed simultaneously, or in any other order. Indeed, in one embodiment, the rifleman's press of the button to determine range prompts the processor to take all the required actions of Steps 702, 704, and 706, such that the rifleman need only aim and shoot after pressing the button.

The aiming point is then determined based on the above information (Step 708). The information relevant to the aiming point is then sent to the optical device to be displayed (Step 710). In embodiments of optical devices that include addressable aiming elements, the appropriate aiming element is energized. For devices without such addressable elements, a number may be displayed in the field of view. This number may be associated with a particular aiming point that the shooter must align with the target to properly aim the rifle. This step also contemplates a manual adjustment of the aiming point (for reticles that do not utilize addressable aiming points). Regardless, after selection of the appropriate aiming point for the magnification setting, the rifleman may align this aiming point on the target and fire.

Additional functionality may be built into the control system that is used with the optical device. For example, the processor may wait a predetermined period of time t after energizing the aiming element (Step 712). During this time, if the processor detects a change in magnification (Step 714), it may re-run all or some of the steps of the method (in the depicted method, the processor assumes the range is unchanged). The processor will then identify an updated aiming point more appropriate for the new magnification setting. If the time t exceeds a predefined limit, the process may end (Step 716), requiring the rifleman to again press the button to begin the full process. In still another embodiment, the method includes adjusting the optical device to maximum magnification. This may require use of a control motor to adjust the position of the lens or power ring or, in the case of camera-based optical devices, this function may be incorporated into the camera magnification controls. In such an embodiment, the press of a range-finding button may initiate all of Steps 702-706, in addition to setting the optical device to a predetermined (or a maximum) magnification.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A method of determining an aiming point for a sighting system used by a shooter to shoot a target, the method comprising:
    receiving a range signal, wherein the range signal corresponds to a distance from the shooter to the target;
    receiving a first position signal from a magnification system sensor;
    automatically adjusting a component associated with the magnification system sensor prior to receiving the first position signal;
    determining a first magnification setting based at least in part on the first position signal; and
    determining a first aiming point based at least in part on both of the range signal and the first magnification setting.

2. The method of claim 1, further comprising:
    energizing an element on the sighting system based at least in part on the first aiming point.

3. The method of claim 1, further comprising:
    receiving a second position signal from the magnification system sensor;
    determining a second magnification setting based at least in part on the second position signal; and
    determining a second aiming point based at least in part on both of the range signal and the second magnification setting.

4. The method of claim 3, further comprising:
    de-energizing a previously-energized element on the sighting system; and
    energizing an element on the sighting system based at least in part on the second aiming point.

5. The method of claim 2, further comprising:
    setting a timer; and
    de-energizing the first aiming point when a predetermined time is reached.

6. The method of claim 1, further comprising:
    receiving a ballistic signal from a ballistic module; and
    determining the first aiming point based at least in part on the ballistic signal.

7. The method of claim 1, wherein the range signal comprises a user input.

8. The method of claim 1, wherein the first position signal is based at least in part on a position of a movable lens of the sighting system.

9. The method of claim 1, wherein the first position signal is based at least in part on a position of an actuation element of the sighting system.

10. The method of claim 1, wherein automatically adjusting the component associated with the magnification system sensor comprises receiving a predefined magnification curve for the sighting system.

11. The method of claim 10, automatically adjusting the component associated with the magnification system sensor further comprises scaling the predefined magnification curve so as to correspond to both a minimum and a maximum position signal from the magnification system sensor.

12. A sighting system for visually acquiring a target, the sighting system comprising:
    an optic device comprising a fixed lens and a moveable lens, wherein the fixed lens and the movable lens define an optical path, and wherein the movable lens is movable along the optical path;
    an actuator for moving the movable lens;
    a sensor for determining at least one of a position of the movable lens and a position of the actuator;
    a range finder;
    a processor for receiving a sensor signal sent from the sensor and a range signal sent from the range finder; and
    an input system in communication with the processor, the input system adapted to receive ballistic information.

13. The sighting system of claim 12, further comprising an aiming component comprising a plurality of aiming elements, each aiming element being separately addressable and operable to provide an aiming point.

14. The sighting system of claim 13, wherein the processor energizes an aiming element based at least in part on the sensor signal, the ballistic information, and the range signal.

\* \* \* \* \*